(12) United States Patent
Minemura

(10) Patent No.: US 12,216,303 B2
(45) Date of Patent: Feb. 4, 2025

(54) LIGHT-GUIDE PLATE, MANUFACTURING METHOD FOR THE SAME, LIGHT-GUIDE PLATE MODULE, AND IMAGE DISPLAY DEVICE

(71) Applicant: Hitachi-LG Data Storage, Inc., Tokyo (JP)

(72) Inventor: Hiroyuki Minemura, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 575 days.

(21) Appl. No.: 17/603,353

(22) PCT Filed: Feb. 13, 2020

(86) PCT No.: PCT/JP2020/005519
§ 371 (c)(1),
(2) Date: Oct. 13, 2021

(87) PCT Pub. No.: WO2020/255482
PCT Pub. Date: Dec. 24, 2020

(65) Prior Publication Data
US 2022/0206207 A1    Jun. 30, 2022

(30) Foreign Application Priority Data
Jun. 21, 2019    (JP) .................. 2019-115048

(51) Int. Cl.
*G02B 5/18*    (2006.01)
*F21V 8/00*    (2006.01)
(52) U.S. Cl.
CPC ......... *G02B 6/0016* (2013.01); *G02B 5/1861* (2013.01); *G02B 6/0038* (2013.01); *G02B 6/0065* (2013.01); *G02B 2005/1804* (2013.01)

(58) Field of Classification Search
CPC .. G02B 6/0016; G02B 5/1861; G02B 6/0038; G02B 6/0065; G02B 2005/1804;
(Continued)

(56) References Cited

U.S. PATENT DOCUMENTS 6,580,529 B1    6/2003 Amitai et al.
2002/0003637 A1*    1/2002 Watanabe ............ G03H 1/0005
359/22
(Continued)

FOREIGN PATENT DOCUMENTS

CN    107870428 A    4/2018
CN    109239920 A    1/2019
(Continued)

OTHER PUBLICATIONS

Japanese Office Action received in corresponding Japanese Application No. 2019-115048 dated Jan. 24, 2023.
(Continued)

*Primary Examiner* — Darryl J Collins
*Assistant Examiner* — Matthew Y Lee
(74) *Attorney, Agent, or Firm* — MATTINGLY & MALUR, PC

(57) ABSTRACT

The light-guide plate includes a substrate, an incidence diffraction grating that diffracts incident light, and an emission diffraction grating that emits light from the substrate, the light being diffracted by the incidence diffraction grating. The emission diffraction grating is formed of a recessed/projected pattern formed on a substrate surface, the recessed/projected pattern includes a first group of parallel straight lines and a second group of parallel straight lines intersecting the first group of parallel straight lines, and a pitch of the first group of parallel straight lines is equal to a pitch of the second group of parallel straight lines. A relationship between the pitch P of the first group of parallel straight lines (Continued)

and the second group of parallel straight lines and a pattern width W of the recessed/projected pattern is defined as W/P, which is 0.15 or more and 0.85 or less.

17 Claims, 14 Drawing Sheets

(58) Field of Classification Search
CPC .............. G02B 6/00; G02B 2027/0125; G02B 27/0172; G02B 27/02
See application file for complete search history.

(56) References Cited

U.S. PATENT DOCUMENTS

| | | |
|---|---|---|
| 2007/0070504 A1 | 3/2007 | Akutsu et al. |
| 2011/0242635 A1* | 10/2011 | Oka .................. G02B 27/0172 |
| | | 359/207.7 |
| 2012/0236415 A1 | 9/2012 | Nagano |
| 2013/0250380 A1 | 9/2013 | Fujikawa et al. |
| 2016/0033784 A1 | 2/2016 | Levola et al. |
| 2016/0124229 A1* | 5/2016 | Yokoyama ......... G02B 27/4205 |
| | | 385/37 |
| 2016/0139407 A1 | 5/2016 | Yokoyama et al. |
| 2016/0231566 A1 | 8/2016 | Levola et al. |
| 2017/0248789 A1* | 8/2017 | Yokoyama ........... G02B 5/1866 |
| 2017/0276957 A1* | 9/2017 | Matsuki ............. G02B 27/0172 |
| 2018/0052501 A1 | 2/2018 | Jones, Jr. et al. |
| 2018/0113313 A1* | 4/2018 | Tekolste ............ G02B 27/0081 |
| 2018/0210205 A1 | 7/2018 | Grey et al. |
| 2019/0121027 A1 | 4/2019 | Popovich et al. |
| 2020/0110261 A1* | 4/2020 | Grey .................. G02B 27/0101 |
| 2020/0166691 A1* | 5/2020 | Vartiainen ............ G02B 5/1842 |
| 2020/0209630 A1* | 7/2020 | Schultz ............. G02B 27/0081 |
| 2022/0026619 A1* | 1/2022 | Park ..................... G02B 5/1819 |
| 2022/0197036 A1* | 6/2022 | Valera ................ G02B 27/4211 |

FOREIGN PATENT DOCUMENTS

| | | |
|---|---|---|
| JP | 2000-039516 A | 2/2000 |
| JP | 2007-94175 A | 4/2007 |
| JP | 2011-209376 A | 10/2011 |
| JP | 2013-200467 A | 10/2013 |
| JP | 2015-049376 A | 3/2015 |
| JP | 2015-105990 A | 6/2015 |
| JP | 2016-085426 A | 5/2016 |
| JP | 2016-095444 A | 5/2016 |
| JP | 2017-156388 A | 9/2017 |
| JP | 2017-173486 A | 9/2017 |
| JP | 2017-528739 A | 9/2017 |
| JP | 2019-512745 A | 5/2019 |
| WO | 2018/178626 A1 | 10/2018 |
| WO | 2018/206847 A1 | 11/2018 |
| WO | 2018/231754 A1 | 12/2018 |

OTHER PUBLICATIONS

International Search Report of PCT/JP2020/005519 dated Apr. 14, 2020.
Chinese Office Action received in corresponding Chinese Application No. 202080045388.0 dated Mar. 29, 2024.

* cited by examiner

| ASPECT RATIO | 2.0 | 0.8 | 0.4 |
|---|---|---|---|
| PATTERN | | | |
| PROJECTED IMAGE (SIMULATION) | | | |
| PATTERN PITCH (nm) | 420 | ← | ← |
| PATTERN HEIGHT (nm) | 80 | ← | ← |
| PATTERN WIDTH (nm) | 40 | 100 | 200 |
| $\eta_{11}/\eta_1^2$ | 0.29 | 0.86 | 4.3 |

LIGHT-GUIDE PLATE, MANUFACTURING METHOD FOR THE SAME, LIGHT-GUIDE PLATE MODULE, AND IMAGE DISPLAY DEVICE

TECHNICAL FIELD

The present invention relates to a technique for manufacturing an image display device composed of a combination of a light-guide plate and a diffraction element, the image display device being small in size and light in weigh and capable of displaying an image, such as an augmented reality.

BACKGROUND ART

An image display device that creates an augmented reality allows a user to view not only the projected image but also the surroundings. The projected image may overlap a real world perceived by the user. Such a display is used in other various applications, such as video games and glasses-like wearable devices. The user wears a glasses-like or goggle-like image display device in which a translucent light-guide plate and a projector (light source) are integrated together. This allows the user to visually recognize an image supplied from the projector, the image being superimposition on the real world.

One of such image display devices is described in "PTL 1" to "PTL 3". According to these patent documents, a light-guide plate is composed of a plurality of diffraction gratings of recessed/projected patterns formed on a glass substrate. A beam of light emitted from a projector is coupled to the light-guide plate by an input diffraction grating and propagates inside the light-guide plate while being totally reflected. As the beam of light propagates inside the light-guide plate while being totally reflected, the beam of light is transformed into a plurality of beams of light replicated by another diffraction grating, and is finally emitted out of the light-guide plate. Part of the emitted beam of light enters a user's pupils and focuses on the retina to form an image, which is recognized by the user as an augmented reality image superimposed on an image of the real world.

In the light-guide plate including such diffraction gratings of recessed/projected patterns, a wave number vector K of a beam of light emitted from the projector becomes K0 because the beam of light entering the light-guide plate is refracted according to the Snell's law. Furthermore, a diffraction grating for incident light transforms the incoming beam of light into a beam of light with a wave number vector K1 that can propagate inside the light-guide plate in a state of being totally reflected. The beam of light is further subjected to diffracting actions by one or a plurality of different diffraction gratings provided on the light-guide plate, and the wave number vector is changed to K2, K3, and so on by a repetitive cycle of diffraction each of which causes the wave number vector to change. When the wave number vector of the beam of light finally coming out of the light-guide plate is K', |K'|=|K| holds. In a case where the projector is located opposite to the eyes with respect to the light-guide plate, K'=K holds. In the case where the projector is located opposite to the eyes with respect to the light-guide plate, the light-guide plate has the same effect on the wave number vector as a reflection mirror has. In this case, taking the normal vector of the light-guide plate in the z direction and comparing x, y, and z components of the wave number vector gives expressions: Kx'=Kx, Ky'=Ky, Kz'=−Kz.

The light-guide plate functions in such a way that it guides a beam of light emitted from the projector while replicating the beam of light to produce a plurality of beams of light and allows the user to recognize the plurality of beams of light coming out of the light-guide plate, as image information equivalent to the original image. In this process, the group of beams of light replicated has the wave number vector equivalent to the wave number vector of the beam of light emitted from the projector, the beam of light having image information, and is expanded spatially. A part of the group of beams of light replicated enters the pupils and impinges on the retina to form an image together with incoming information of the outside world, thus providing the user with information of an augmented reality that is added to the information of the outside world.

The beam of light having the image information varies in wave number vector size, depending on the wavelength of the beam of light. Because a diffraction grating of a recessed/projected pattern has a constant wave number vector, the wave number vector K1 of diffracted light varies depending on the wavelength of the incident beam of light. Diffracted beams of light thus propagate in the light-guide plate at different angles. The refraction factor of the glass substrate making up the light-guide plate is substantially constant with respect to the wavelength, and therefore a range of a condition under which the beam of light is guided while being totally reflected varies depending on the wavelength of the incident beam of light. For this reason, to allow the user to recognize an image with a wide viewing angle, it is necessary to stack a plurality of different light-guide plates respectively for different wavelengths. In general, the number of light-guide plates corresponding to 3 color factors R, G, and B or 3 minus or plus 1, i.e., about 2 or 4 is considered to be the proper number of light-guide plates.

An image display device described in "PTL 1" is an image display device that expands input light in a two-dimensional space, and includes three linear diffraction gratings. One of the diffraction gratings is a diffraction grating for incidence, and the other two are diffraction gratings for emission, which are typically placed on the front and back surfaces of the light-guide plate, respectively, in such a way as to overlap each other and function as a diffraction grating for replication and a diffraction grating for emission. "PTL 1" also describes an example in which a diffraction grating for emission is formed on one surface, as a cyclic structure of columnar photonic crystals.

"PTL 2" describes an image display device which is configured to have a plurality of linear side faces by a newly disclosed technique. This technique is applied to the image display device in order to solve a problem that an image projected by the photonic crystals described in "PTL 1" has high brightness at the central part of a view area.

In an image display device described in "PTL 3" and "PTL 4", three diffraction gratings serving respectively as an incidence diffraction grating, a deflection diffraction grating, and an emission diffraction grating are arranged such that their areas do not overlap in a light-guide plate. "PTL 3" discloses a triangular diffraction grating that is overhung to increase the diffraction efficiency of the diffraction grating serving as the incidence diffraction grating.

"PTL 5" and "PTL 6" disclose a technique according to which two reflection-type volume holograms for incidence and emission are used as diffraction gratings formed on a light-guide plate. The volume holograms described in these documents are provided by forming multiple diffraction gratings corresponding to a plurality of wavelengths in a space, and, unlike the above diffraction grating of the recessed/projected pattern, these diffraction gratings diffract beams of light with a plurality of wavelengths, at the same angle. Using one light-guide plate, therefore, allows the user to recognize an RGB image. However, while the above diffraction grating of the recessed/projected pattern replicates the beam of light in a two-dimensional direction in the light-guide plate and therefore provides a wide viewing angle, the diffraction gratings of the volume holograms offer only the one-dimensional replication function and therefore provide a relatively narrow viewing angle.

CITATION LIST

Patent Literature

PLT 1: JP 2017-528739 W
PLT 2: WO 2018/178626
PLT 3: US2016/0231566 A1
PLT 4: U.S. Pat. No. 6,580,529
PLT 5: Japanese Patent Application Laid-Open No. 2007-94175
PLT 6: Japanese Patent Application Laid-Open No. 2013-200467

SUMMARY OF INVENTION

Technical Problem

According to the light-guide plate (image display element) described in "PTL 1" to "PTL 4", which is advantageous for providing a wide viewing angle, and the image display device including the light-guide plate, plasticizing the light-guide plate makes it possible to provide a new light-guide plate that, compared with the conventional light-guide plate made of glass, achieves improved safety against scattering and weight reduction as well. In the present specification, "plastic" refers to polymer compound materials and excludes glass, representing a concept encompassing resins, polycarbonate, acrylic resins, photocurable resins, and the like.

In the following description of the present invention, light-guide plates to discuss will be limited to a light-guide plate having a diffraction grating of a recessed/projected pattern. In addition, to facilitate understanding, inversion of an image by the eyes' lens effect and the brain's effect of processing an image projected on the retina and inverting/recognizing the image are omitted from the description, and a relationship between a pixel position and brightness will be discussed for a case where a projected image is created by projecting light from an image light source located on the same side on which the eyes are present relative to a light-guide plate, onto a screen located ahead of the light source. The image actually recognized is a vertically inverted version of the projected image.

"PTL 1" relates to a substrate material of the light-guide plate, and discloses a technique of using a glass material provided on the surface of a glass plate, as the grating, which is shown in FIGS. 15A and 15B of "PTL 1". As a technique concerning diffraction grating formation, "PTL 1" also discloses a technique of etching the surface of a waveguide (=glass plate) to form the diffraction grating.

FIG. 3 of "PTL 1" presents a perspective view of the light-guide plate. "PTL 1" also discloses a technique of forming two emission gratings on one surface using photonic crystal structures. FIG. 16 of "PTL 1" shows arrangement of columns formed on the photonic crystal structure of "PTL 1". A cycle of arrangement of the columns on the photonic crystal structure needs to be equal to or less than a wavelength so that a photonic band gap is formed. The columnar structure of PTL 1 has a refraction factor higher than that of the substrate. However, as it will be described later, when the columnar photonic crystal structure is formed on the surface of the light-guide plate by an injection molding method or the like, the refraction factor of the columns is equal to that of the waveguide (or substrate). In this case, if an aspect ratio, which is a ratio between the diameter and the height of each column, is not about 2 or more, the brightness of a projected image becomes insufficient.

The photonic crystal structure described in "PTL 2", which is effective in dealing with the problem of high brightness at the central part of the projected image, is not columnar but linear photonic crystal structure that solves a problem of the projected image having high brightness at the central part of a view area. The photonic crystal structure is thus configured to have a plurality of linear side faces. FIG. 4 of "PTL 2" shows the shape of the photonic crystal structure. According to "PTL 2", as stated in its 34th line on page 1 and 8th line on page 2, a stripe-like high brightness area at the central part is remedied. In "PTL 2", however, the stripe-like high brightness area at the central part, which is the problem to deal with, is not explicitly shown in the drawings and the like.

The incidence diffraction grating shown in FIG. 5C of "PTL 3" has an overhanging triangular cross section, and can efficiently couple a beam of image light coming from the upper side (air side) in the drawing to the interior of the hatched light-guide plate.

The beam of light having image information is coupled by the incidence diffraction grating provided in the light-guided plate in such a way as to have a wave number that allows the beam of light to be guided in the light-guide plate in a state of being totally reflected, and propagates in the light guide plate. A part of the beam of light intersecting the emission diffraction grating is diffracted and is emitted from the light-guide plate as the part of the beam of light retains the wave number equivalent to the wave number of the original beam of image light. Image information provided to the user has travel angle information corresponding to the pixel position of the original image information, that is, a wave number. In order for light carrying image information of one pixel to come out of the light-guide plate and reach the user's pupils, the light needs to come out of a specific position in the light-guide plate that is determined by the traveling angle, the distance between the light-guide plate and the user's pupils, and the size of the user's pupils. As described above, the beam of light is replicated in the light-guide plate and is emitted therefrom in a spatially spread form. As a result, the user visually recognizes less beam of light as the spatial spread of the beam of light is greater, thus recognizing less brightness. Because an emission position visually recognized by the user changes depending on the pixel position of the original image information, the image display device including the light-guide plate inevitably has a phenomenon of the brightness changing depending on the pixel position.

In the prior art, a method of directly etching a glass substrate, a nanoimprint method suitable for forming a pattern with a high aspect ratio, or the like have been used properly to create the light-guide plate. In the photonic crystal structures of "PTL 2" and "PTL 3" based on the "PTL 2", an aspect ratio, i.e., a ratio between a representative length, such as the diameter of a bottom surface, and a representative height, needs to be about 2 or more.

However, the aspect ratio of a surface recessed/projected pattern formed by the injection molding technique or the like, which has a solid performance record as a manufacturing method for optical disk medium, does not exceed 1. An aspect ratio of 2 or more leads to a drop in pattern transfer precision and is therefore difficult to apply. This is a problem caused by an essential limitation on the manufacturing method that a molten polycarbonate resin, acrylic resin, polyolefin resin, or the like has high viscosity and, because of its high viscosity, does not precisely fill recessions/projections with a high aspect ratio, the recessions/projections being formed at a nanometer cycle.

In the case of using the overhung diffraction grating described in "PTL 3", the light-guide plate cannot be separated from a matrix (stamper) by the injection molding technique or the like, which, therefore, cannot be applied in this case, An object of the present invention is to achieve plasticization of a light-guide plate, thereby providing a light-guide plate that is safe and light in weight.

Solution to Problem

A preferred aspect of the present invention provides a light-guide plate including a substrate, an incidence diffraction grating that diffracts incident light, and an emission diffraction grating that emits light from the substrate, the light being diffracted by the incidence diffraction grating. The emission diffraction grating is formed of a recessed/projected pattern formed on a substrate surface, the recessed/projected pattern includes a first group of parallel straight lines and a second group of parallel straight lines intersecting the first group of parallel straight lines, and a pitch of the first group of parallel straight lines is equal to a pitch of the second group of parallel straight lines. A relationship between the pitch P of the first group of parallel straight lines and the second group of parallel straight lines and a pattern width W of the recessed/projected pattern is defined as W/P, which is 0.15 or more and 0.85 or less.

Another preferable aspect of the present invention provides a light-guide plate module configured by stacking a plurality of the light-guide plates.

Still another preferable aspect of the present invention provides an image display device including the light-guide plate module and a projector that emits image light onto the light-guide plate module, the image light being incident on the incidence diffraction grating.

Still another preferred aspect of the present invention provides a manufacturing method for the light-guide plate, the manufacturing method including the steps of: preparing a substrate made of a polymer compound material; and forming an incidence diffraction grating and an emission diffraction grating on the substrate, using a stamper.

Still another preferable aspect of the present invention provides a light-guide plate including a substrate, an incidence diffraction grating that diffracts incident light, and an emission diffraction grating that emits light. The emission diffraction grating is formed of a linear recessed/projected pattern formed on a surface of the substrate, and diffracts light in a direction perpendicular to the linear recessed/projected pattern at a diffraction efficiency $\eta_1$, the light coming from the incidence diffraction grating and propagating in the substrate, and at the same time, diffracts the light in a direction perpendicular to the substrate at a diffraction efficiency $\eta_{11}$. A relationship between the diffraction efficiencies $\eta_{11}$ and $\eta_1$ is determined to be $\eta_{11} < \eta_1$.

Advantageous Effects of Invention

According to the present invention, plasticization of the light-guide plate can be achieved to provide the light-guide plate that is safe and light in weight.

DESCRIPTION OF EMBODIMENTS

Figure 1:
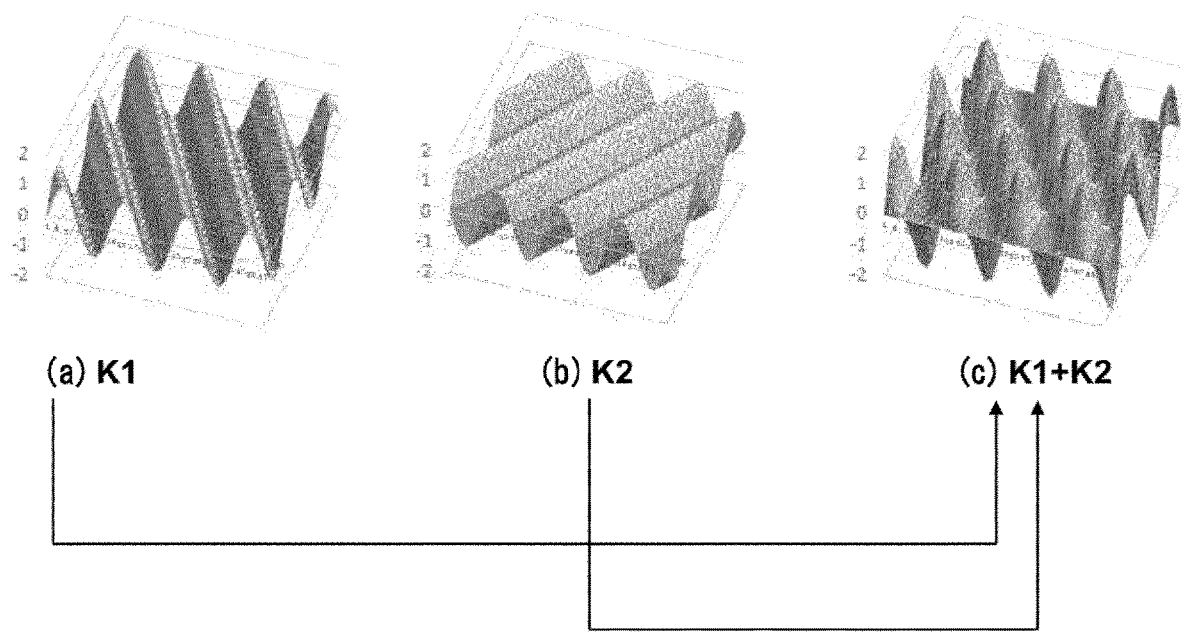
FIG. 1 is a conceptual diagram showing an example of phase functions of emission diffraction gratings.

Embodiments of the present invention will hereinafter be described with reference to the drawings. The present invention, however, should not to be interpreted as the invention limited to the descriptive contents of the embodiments described below. Those skilled in the art will easily understand that specific configurations of the present invention can be changed or modified within a range in which changes/modifications do not lead to deviation from the concept and substance of the invention.

In configurations of the invention described below, the same components or components having similar functions are denoted by the same reference signs in different drawings, and redundant description may be omitted.

In a case where a plurality of elements having the same or similar functions are present, these elements may be given the same reference signs with different subscripts attached thereto for better description. When distinguishing the plurality of elements from each other is unnecessary, however, the elements may be described with no subscripts attached thereto.

In the present specification, such notations as "first", "second", and "third" are attached to identify constituent elements, and do not necessarily limit the number, order, or contents thereof. In addition, a number for identifying a constituent element is used in each context, and such a number used in one context does not necessarily indicate the same configuration in another context. Furthermore, a case where a constituent element identified by a certain number functions also as a constituent element identified by another number is not excluded.

Positions, sizes, shapes, ranges, and the like of constituent elements illustrated in the drawings may not represent actual positions, sizes, shapes, ranges, and the like. This is to facilitate understanding of the invention. The present invention, therefore, is not necessarily limited by positions, sizes, shapes, ranges, and the like indicated in the drawings.

Publications, patents, and patent applications cited herein constitute part of the description of this specification.

In the present specification, constituent elements expressed in singular forms include plural forms thereof unless the context clearly dictates otherwise.

In embodiments described below, a two-dimensional mesh-like pattern is provided as an emission diffraction grating. Thus, by determining the aspect ratio of a recessed/projected pattern transferred to the surface of a light-guide plate to be 1 or less, a light-guide plate manufactured by a plastic molding technique with excellent performance records, such as an injection molding method, can be provided.

A photonic crystal structure and a diffraction grating each have surface recessions/projections by which incident light is subjected to spatial phase modulation. The magnitude of the phase modulation increases in proportional to a difference in refraction factor between a surface structure and the air and to the height of the surface recessions/projections.

FIG. 1 schematically shows wave numbers of emission diffraction gratings. Phase functions of diffraction gratings having wave numbers K1 and K2 with azimuthal angles of ±60 degrees against the Y axis are shown in (a) and (b), respectively, and each phase function has a sinusoidal phase distribution. A phase modulation amount is normalized to 1. Synthesizing these diffraction gratings yields (c). It can be said that a photonic crystal structure is created by providing the diffraction grating (c) with projections approximated to pillars and the like to offer a high refraction factor and forming such a diffraction grating (c) on the surface of a light-guide plate.

As it can be seen from (c) of FIG. 1, the maximum value of the phase modulation amount by K1+K2 is 2. This demonstrates the fact that when projections of (c) are approximated to isolated columns or the like, the diffraction grating (c) needs a height (aspect ratio) twice as large as that of the single sinusoidal diffraction gratings of (a) and (b) of FIG. 1.

Figure 2:
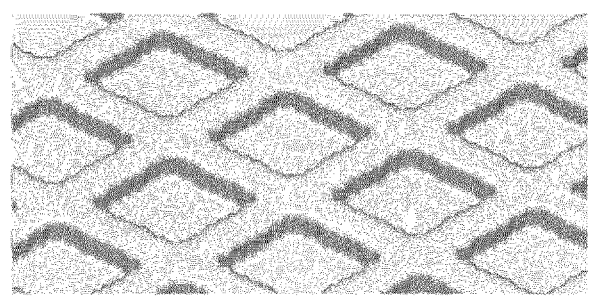
FIG. 2 is a schematic diagram of a diffraction grating of a mesh pattern.

FIG. 2 is a schematic diagram of an emission diffraction grating of a mesh pattern according to the present embodiment. Comparing FIG. 2 with (c) of FIG. 1 reveals that the diffraction grating of FIG. 2 is not a sinusoidal structure and therefore it has higher-order wave number components when subjected to Fourier transform. However, when this diffraction grating is used as a light-guide plate, properly selecting a cycle makes wave umber components of the second order or higher order incapable of diffracting incident light (wave number being an imaginary number). Besides, the diffraction grating of the mesh pattern is created by superposing rectangular diffraction gratings with azimuthal angles of ±60 degrees, and unlike a diffraction grating of a columnar pattern or the like, does not have wave number components different from wave number components in the directions of fundamental waves K1 and K2. For this reason, the diffraction grating of the mesh pattern can have high diffraction efficiency.

An incidence diffraction grating of the present embodiment is provided not as a transmission-type diffraction grating disclosed in "PTL 3" but as a reflection-type diffraction grating, which, in contrast with refraction, utilizes reflection with a large deflection effect to achieve a low aspect ratio.

In this manner, a two-dimensional emission diffraction grating with a small aspect ratio can be provided, and therefore a light-guide plate that is safe and light in weight can be provided, the light-guide plate being manufactured by a plastic molding technique, such as an injection molding method. Since the present invention aims to create the light-guide plate by applying the plastic molding technique, the following description will be made on the assumption that the aspect ratio is determined by taking the transferability of a resin to the recessed/projected pattern into consideration. When the cycle of the recessed/projected pattern is denoted by p, the width of each projection is denoted by w, and the height of the projection is denoted by h, the transferability of the resin is determined on the basis of transfer of the resin to a recession or a projection that is narrower one. The aspect ratio is, therefore, defined as h/min (w, p−w). Here, min (w, p−w) denotes that either w or p−w that is smaller one is selected. See FIG. 11C, which will be referred to later.

The following embodiment will be described using a coordinate system in which an optical axis direction corresponds to the Z axis and the surface of the light-guide plate corresponds to the X-Y plane. In the following description, when the user's pupils are approximated to circles, an emission position in the light-guide plate, the emission position being visually recognized by the user, is also regarded as a circle according to a pixel position. This circle will hereinafter be referred to as an output circle.

Figure 3:
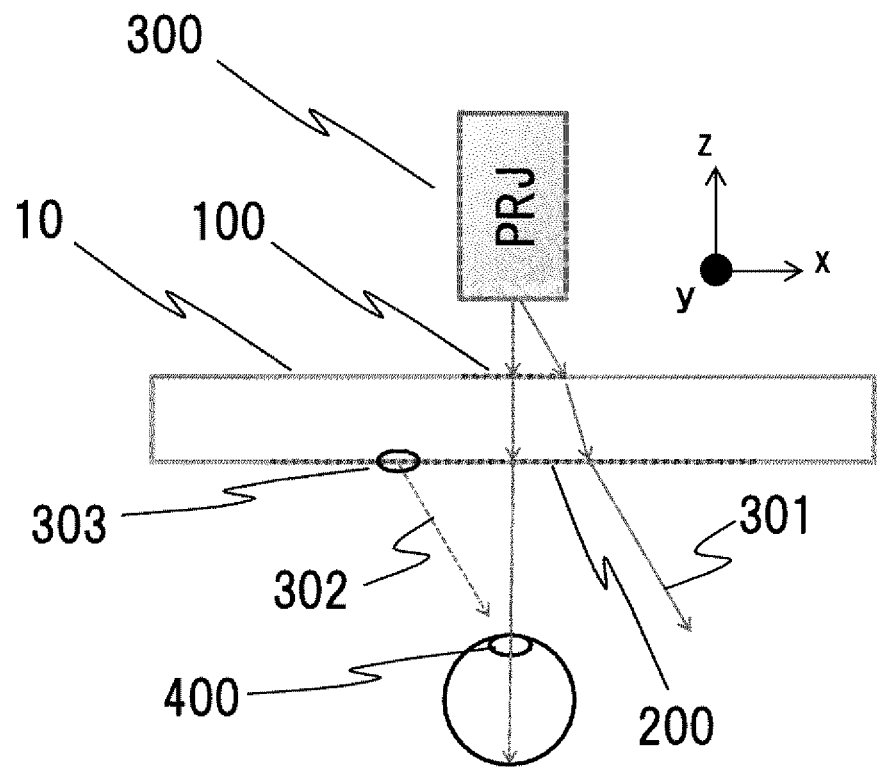
FIG. 3 is a conceptual diagram showing a definition of an output circle.

FIG. 3 is a schematic diagram for explaining the output circle. FIG. 3 depicts a case where a projector 300, which is a light source for forming an image, and the user's pupils 400 are located opposite to each other with respect to a light-guide plate 10. Under the assumption that a wave number vector of an incidence diffraction grating 100 faces the y direction, arrows in FIG. 3 represent beams of light on the x-z plane. When the incidence diffraction grating 100 does not have a wave number vector component in the x direction, a beam of light 301 emitted from the projector 300, the beam of light 301 traveling straight, travels rightward in FIG. 3. Meanwhile, to allow the user to recognize this beam of light 301 as a projected image, a beam of light 302 with the same angle as that of the beam of light 301 needs to travel through a path shown as a path for the beam of light 302 to be visually recognized and reach the user's pupils 400. An output circle 303 is a virtual circle that lies on an emission diffraction grating 200 and that is obtained by translating the user's pupils 400 in the direction of the beam of light to be visually recognized. Only the beam of light 302 coming out of the output circle 303 on the emission diffraction grating 200 is recognized as the projected image by the user, and other beams of light are not recognized.

Figure 4A:
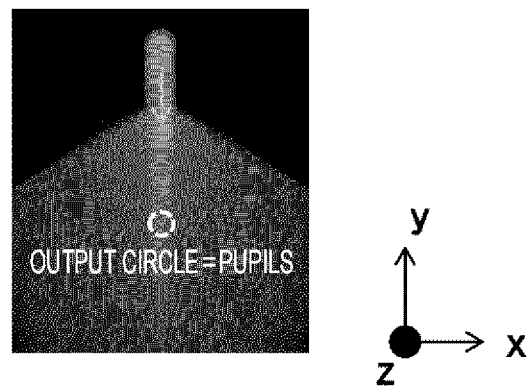
FIG. 4A is an image diagram of an intensity distribution of a beam of light at the center of an image, the beam of light propagating inside a light-guide plate.
Figure 4B:
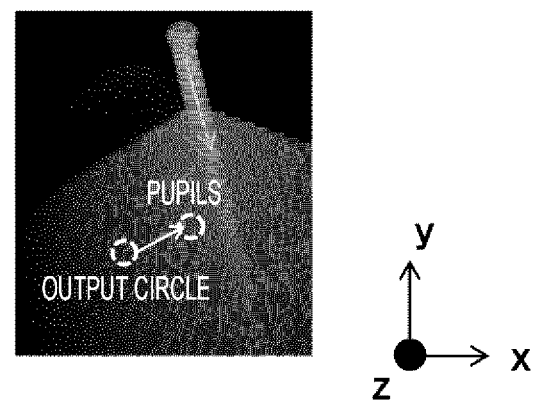
FIG. 4B is an image diagram of an intensity distribution of a beam of light at the edge of an image, the beam of light propagating inside the light guide plate.

FIGS. 4A and 4B show intensity distributions of beams of light propagating inside the light-guide plate, the intensity distributions being calculated using a simulation method to be described later. In FIGS. 4A and 4B, an incidence diffraction grating is located on the upper side, and the pupils, i.e., the user's eyes are located below the incidence diffraction grating.

FIG. 4A shows an intensity distribution of a beam of light at the center of an image, indicating a case where a pixel position corresponds to the center of a projected image. An output circle in FIG. 4A indicates an area where the beam of light reaching the pupils is diffracted last time on an emission diffraction grating. A high brightness area on a straight line extending from the incidence diffraction grating in the y direction indicates a main beam-of-light group diffracted by the incidence diffraction grating and propagating inside the light-guide plate. As it can be seen from FIG. 4A, the intensity distribution is characterized in that propagation of the main beam-of-light group results in a gradual attenuation of the intensity. A beam-of-light group with low brightness spreading around the main beam-of-light group is a beam-of-light group that is diffracted by the emission diffraction grating to have its traveling direction deflected on the x-y plane. Under this condition, since the beam of light is projected in the z-axis direction, it is understood that the output circle and the pupils coincide with each other on the x-y plane. A beam of light reaching the pupils and recognized as an image is, therefore, a part of the main beam-of-light group with high brightness.

FIG. 4B is an intensity distribution of a beam of light at the edge of an image, showing a case where the pixel position corresponds to an upper right corner of a projected image. As it can be seen from FIG. 4B, the main beam-of-light group travels downward in the right direction, from the incidence diffraction grating. The position of the pupils is fixed but the output circle is the position at which a beam-of-light group traveling upward in the right direction to head for the pupils comes out. For this reason, on the x-y plane, the output circle is shifted downward in the left direction relative to the pupils. In this case, because the output circle is separated away from the main beam-of-light group, the beam-of-light group reaching the pupils and recognized as the image has brightness lower than its brightness in the above case. These facts described above are the primary cause of uneven brightness that occurs when an image is projected using the light-guide plate.

Figure 5:
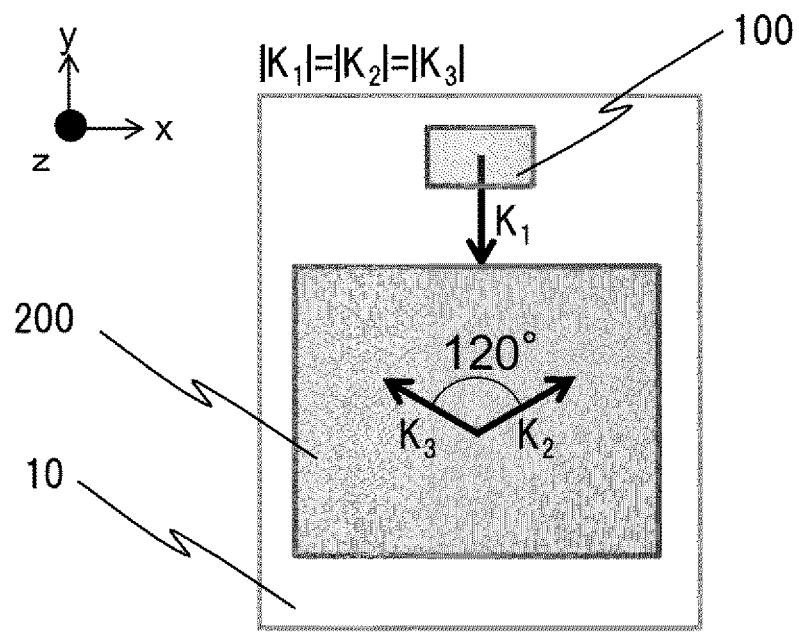
FIG. 5 is a schematic top view of a light-guide plate of an embodiment.

FIG. 5 is a top view of the structure of a light-guide plate of the embodiment, schematically showing wave numbers of the light-guide plate. The incidence diffraction grating 100 and the emission diffraction grating 200, each of which has a single grating pitch, are formed on the light-guide plate 10.

When the grating pitch is P, the magnitude of a wave number vector of the diffraction grating is expressed as $K=2p/P$. In a coordinate system in which an optical axis direction corresponds to the z-axis, a wave number vector of the incidence diffraction grating 100 is expressed as $K1=(0, -K, 0)$. The emission diffraction grating 200 has two wave number vectors that make an angle of 120 degrees and that are expressed as $K2=(+K/\sqrt{3}, K/2, 0)$ and $K3=(-K/\sqrt{3}, K/2, 0)$, respectively. When a wave number vector of a beam of light incident on the light-guide plate 10 is defined as $k^i=(k^i_x, k^i_y, k^i_z)$, a wave number vector of a beam of light coming out of the light-guide plate 10 is defined as $k^o=(k^o_x, k^o_y, k^o_z)$, and K1, K2, and K3 are added to $k^i$ component by component in sequence, $k^o=k^i$ is derived from equations below. This demonstrates the fact that the beam of light having the same wave number vector as the incident beam of light, that is, the beam of light having the same image information comes out of the light-guide plate 10.

$$k^o=k^i$$

$$k^o_x=k^i_x+0+(K/\sqrt{3})-(K/\sqrt{3})=k^i_x$$

$$k^o_y=k^i_y+K-(K/2)-(K/2)=k^i_y$$

$$k^o_z=k^i_z \quad (1)$$

With a fact that the wave number vector of the diffraction grating is added to the wave number vector of the beam of light due to diffraction effects being taken into consideration, the following relationship holds in a case where the beam of light is emitted from the light-guide plate after being diffracted N times.

[Mathematical formula 1]

$$\sum_{i=1}^{N} m_i K_i = 0 \quad (2)$$

$m_i$ and $K_i$ denote a diffraction order at the i-th intersection and the wave number vector of the diffraction grating, respectively.

The left side of the above formula represents a change in the wave number vector caused by diffraction, and when it is not zero, the beam of light is totally reflected by the surface of the light-guide plate and propagates while spatially spreading. (Expression 1) and (Expression 2) express a function of enlarging an entrance pupil, the function being exerted by the light-guide plate.

The emission diffraction grating 200 is composed of a two-dimensional recessed/projected pattern formed on the surface of a substrate. Three types of diffraction, K2, K3, and K2+K3, are generated as a result of the beam of light's intersecting the emission diffraction grating. The first diffraction K2 and the second diffraction K3 are first-order diffraction by a normal diffraction grating, and they have the same diffraction efficiency $\eta_1$ due to the symmetry of the diffraction grating. It follows from (Equation 2) that a beam of image light is emitted from the light-guide plate after being diffracted two times, with an emission point being shifted in the x direction. In this case, the product of the diffraction efficiencies $\eta_1 \times \eta_1 = (\eta_1)^2$ is a main parameter that determines brightness at the periphery of a view area.

Diffraction K2+K3 generated by intersection with the emission diffraction grating is two-dimensional first-order diffraction, in which case the beam of image light is emitted from the light-guide plate after being diffracted once. In this diffraction, a diffraction efficiency $\eta_{11}$ is a main parameter that determines brightness at the center of the view area. Here, a brightness factor for a projected image and an uneven brightness factor for the center and the periphery of the projected image are defined as follows.

$$\text{Brightness factor } B = (\eta_1)^2 \tag{3}$$

$$\text{Uneven brightness factor } U = \eta_{11}/(\eta_1)^2 \tag{4}$$

A simulation method for analyzing an image display element of the embodiment will then be briefly described. The ray tracing method [G. H. Spencer and M. B. T. K. Murty, "General Ray-Tracing Procedure", J. Opt. Soc. Am. 52, p. 672 (1962).] proposed by G. H. Spencer et al. in 1962 is a method of calculating an image or the like observed at a certain point by tracing a path with attention paid to the particle properties of light, and has been vigorously improved mainly in the field of computer graphics [16-18]. The Monte Carlo ray tracing method [I. Powell "Ray Tracing through sysytems containing holographic optical elements", Appl. Opt. 31, pp. 2259-2264 (1992).] based on the ray tracing method is a method of stochastically treating path separation due to diffraction, reflection, or the like to prevent an exponential increase in the amount of calculation, and is suitable for simulation of a light-guide plate that repeats diffraction and total reflection propagation. The Monte Carlo ray tracing method allows faithful reproduction of reflection and refraction. As for diffraction analysis, however, developing a suitable model is essential.

For simulation of a light-guide plate for a head mounted display, a diffraction model providing a wavelength range (about 400-700 nm) covering the entire visible light range and an incident angle range corresponding to a viewing angle 40° of a projected image is essential, and such a model requires an enormous amount of calculations commercially available. Here, in view of the fact that a visually recognized beam of light is part of the entire beam of light, an algorithm that stops calculation of a beam of light guided to an area not visible in the first place is adopted. This algorithm reduces the amount of calculations to 1/1000 or less. The angle/wavelength dependency of the diffraction efficiency of the diffraction grating is calculated in advance by a finite differential time domain (FDTD) method, and calculation results are listed on a table, which is referred to.

First Embodiment

Figure 6:
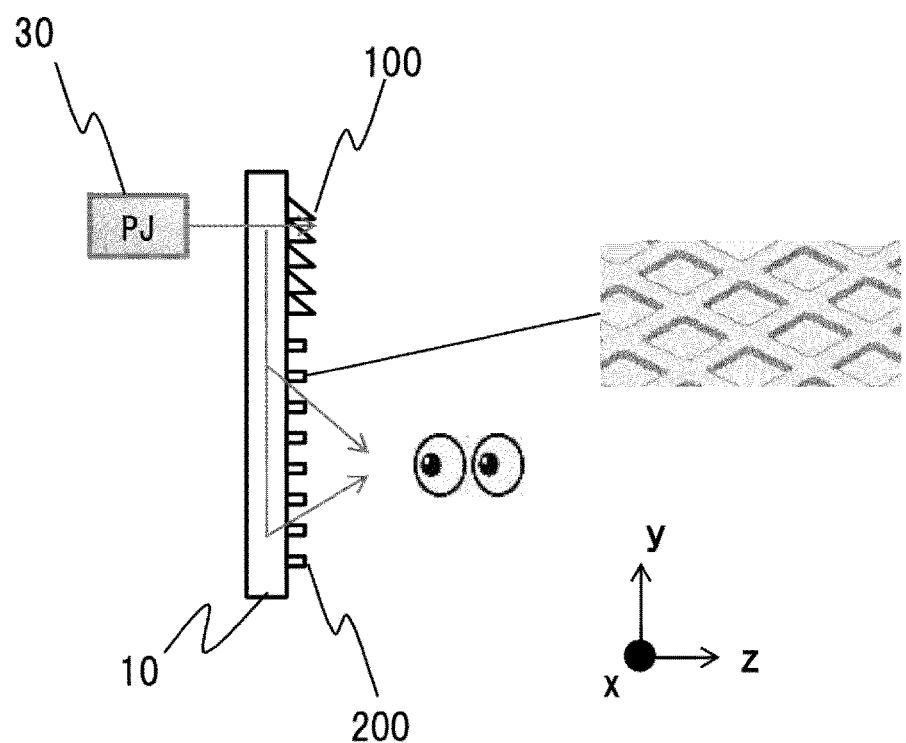
FIG. 6 is a schematic side view of the light-guide plate of the embodiment.

FIG. 6 is a side view showing a configuration of an image display element of the present embodiment. In FIG. 6, the incidence diffraction grating 100 and the emission diffraction grating 200 are formed on the light-guide plate 10. The incidence diffraction grating 100 is composed of a grating pattern that is linear in the x direction, and the cycle of the pattern is P. The emission diffraction grating 200 is a linear grating pattern with the same pattern cycle P, in which an angle each grating element and the x axis make is θo. As the emission diffraction grating 200, a diffraction grating of a mesh pattern having linear grating elements intersecting each other, which is shown in FIG. 2, is formed. θo is, for example, 60 degrees. This angle, however, may be adjusted in accordance with the size of the light-guide plate. The following description of the embodiment will be made on the assumption that θo is 60 degrees. The pattern cycle P, for example, ranges from 0.3 μm to 0.6 μm, and may be changed in accordance with the wavelength of light from a light source or with applications.

Projected images obtained respectively by a diffraction grating of a photonic crystal structure disclosed in PTL 1 and the diffraction grating of the mesh pattern of the present embodiment, both diffraction gratings having the same aspect ratio of 0.8, have been compared with each other. Simulation conditions are set as follows: the pattern pitch P is 420 nm, the pattern height is 80 nm, the wavelength of the beam of light is 550 nm, the thickness of the light-guide plate is 1.0 mm, and the refraction factor of the light-guide plate is 1.58. The viewing angle of the projected image is 40 degrees.

In the embodiment of FIG. 6, from a viewpoint of achieving a low aspect ratio, a reflection-type diffraction grating is used as the incidence diffraction grating 100. For process-related reasons, the emission diffraction grating 200 is formed on the same surface of light-guide plate 10 where the incidence diffraction grating 100 is formed.

Figure 7A:
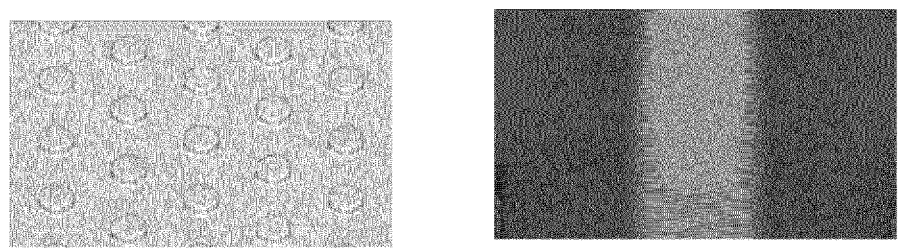
FIG. 7A is an explanatory view showing a projected image created by a photonic crystal diffraction grating.
Figures 7B, 8:
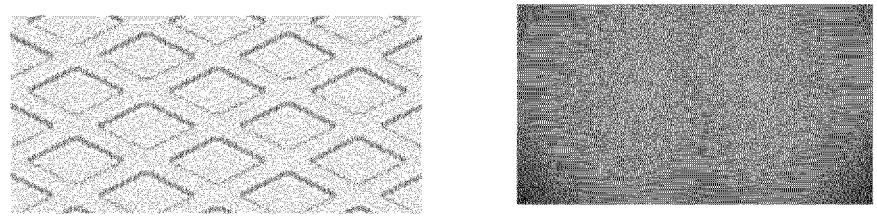
FIG. 7B is an explanatory view showing a projected image created by a diffraction grating of a mesh pattern.
FIG. 8 is a table showing projected images that result when a pattern width of an emission diffraction grating of a mesh pattern is changed.

FIG. 7A shows an image of a diffraction grating composed of a pillar-like photonic crystal structure described in "PTL 1" and a result of simulation of a projected image created by the diffraction grating. FIG. 7B shows an image of the diffraction grating of the mesh pattern of the present embodiment and a result of simulation of a projected image created by the diffraction grating. Both diffraction gratings have an aspect ratio of equal to or less than 1. The aspect ratio of the pillar-like photonic crystal structure is defined as h/d, where h denotes the height of each pillar and d denotes the diameter of the pillar.

It is understood from FIGS. 7A and 7B that when the aspect ratio is 1 or less, the photonic crystal structure of FIG. 7A produces high brightness at the central part of the projected image, thus making the visibility of the image inferior. In contrast, the diffraction grating of the mesh pattern of the present embodiment can offer a fine projected image through a pattern with a low aspect ratio. This is mainly because that in the photonic crystal structure of FIG. 7A, the diffraction efficiency $\eta_{11}$, which determines the brightness of the projected image at the central part of the view area, is larger than the product of diffraction efficiencies, i.e., $(\eta_1)^2$, which determines the brightness of the projected image at the periphery of the view area.

FIG. 8 shows results of simulative calculation of a projected image in a case where the pattern width (line width) of the emission diffraction grating of the mesh pattern of the present embodiment is changed. The pattern pitch (line pitch) and the pattern height (line height) remain the same. Images of patterns (mesh pattern) are also shown in FIG. 8.

As shown in the FIG. 8, when the pattern width is 40 nm, $\eta_{11}/(\eta_1)^2$ is smaller than 1 and therefore the central part of the projected image is dark. When the pattern width is 200 nm, on the other hand, $\eta_{11}/(\eta_1)^2$ is larger than 1 and therefore the central part of the projected image is bright. Further, when the pattern width is 100 nm, $\eta_{11}/(\eta_1)^2$ is close to 1, in which case a brightness distribution of the projected image approaches a uniform distribution.

The above-described results lead to a conclusion that, in the diffraction grating of the mesh pattern of the present embodiment, the brightness distribution of the projected image can be controlled by properly setting the pattern width. If "the absolute value of $(\eta_{11}/(\eta_1)^2)-1$" is used as an uneven brightness factor, the smaller absolute value indicates smaller uneven brightness. Using the absolute value of $|\eta_{11}/(\eta_1)^2|-1$ is, therefore, an intuitively convenient approach.

Figure 9:
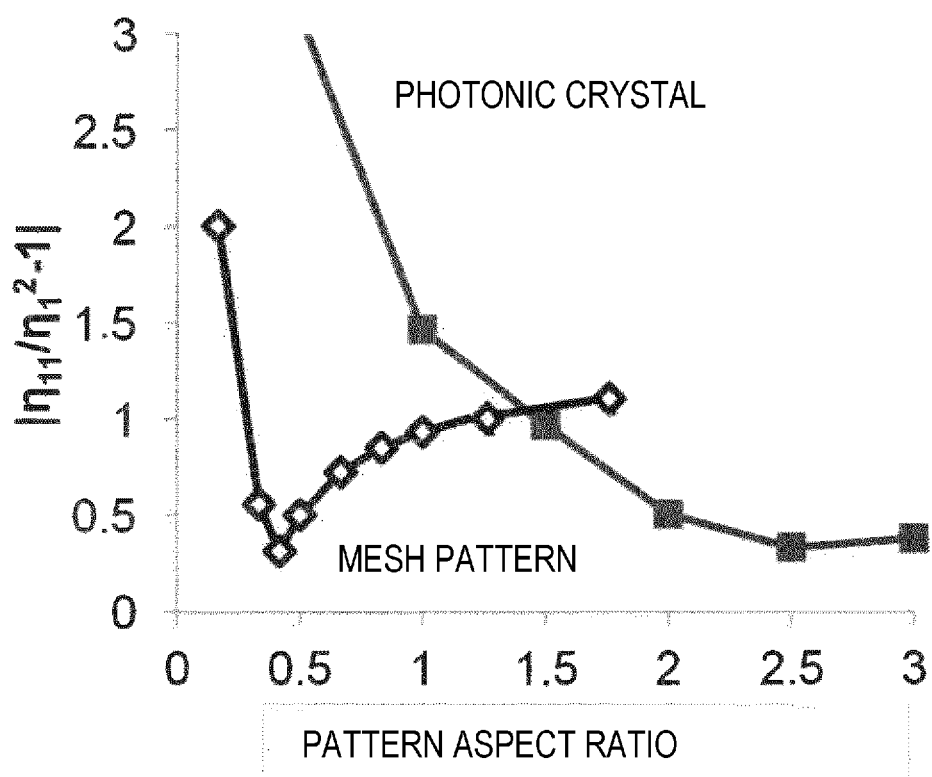
FIG. 9 is a graph indicating a relationship between an uneven brightness factor and a pattern aspect ratio.

FIG. 9 shows a simulation result indicating a relationship between the uneven brightness factor $|\eta_{11}/(\eta_1)^2-1|$ and the aspect ratio of the pattern. In the simulation, the same calculation conditions as described above are adopted as the pattern width is changed to change the aspect ratio. It is understood from FIG. 9 that the diffraction grating of the mesh pattern of the present embodiment can minimize uneven brightness at an aspect ratio of 1 or less, preferably, at an aspect ratio of 0.25 or more and 1.0 or less. Thus, by using the diffraction grating of the mesh pattern of the present embodiment as the emission diffraction grating, a light-guide plate made of plastic that is light in weight and inexpensive can be provided by the injection molding method or the like.

The emission diffraction grating of the present embodiment, as discussed above, diffracts a beam of image light, which propagates from the incidence diffraction grating in a state of being totally reflected, mainly in a direction perpendicular to linear patterns of the diffraction grating at the diffraction efficiency $\eta_1$, while diffracts/emits part of the beam of image light directly in the direction of the user's pupils (direction substantially perpendicular to the light-guide plate) at the diffraction efficiency $\eta_{11}$. At this time, to reduce the uneven brightness of the user's view area, reducing $|\eta_{11}/(\eta_1)^2-1|$ is desirable. In other words, setting $\eta_{11}$ roughly equal to $(\eta_1)^2$ is desirable. For example, $\eta_{11}$ is set 0.8 to 1.2 times $(\eta_1)^2$. In addition, to prevent the center of the view area from becoming too bright, setting $\eta_{11} < \eta_1$ is desirable, and setting $\eta_{11} \ll \eta_1$ is more desirable.

The incidence diffraction grating will then be described.

Figure 10A:
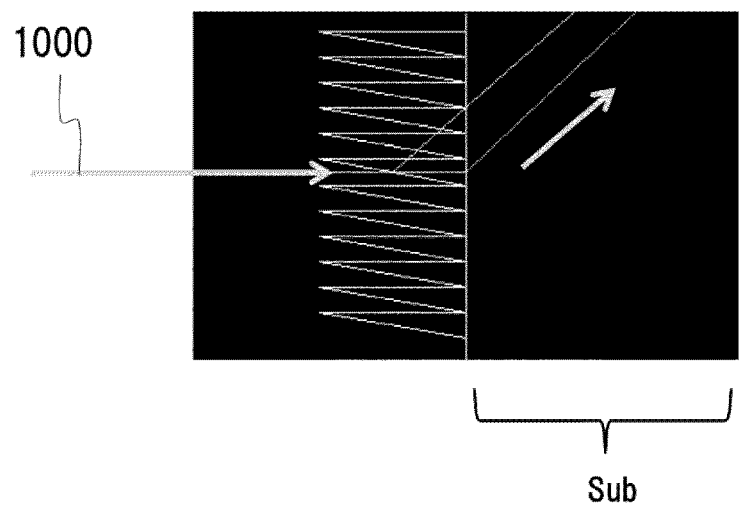
FIG. 10A is an image diagram showing a beam of light diffracted by a transmission-type incidence diffraction grating.

FIG. 10A is a simulation result of the same transmission-type diffraction grating as described in "PTL 3". In the transmission-type diffraction grating, incident light is transmitted/diffracted, and propagates inside the light-guide plate (substrate). The incidence diffraction grating is formed on a surface of light-guide plate that is close to the light source.

A beam of image light 1000 enters the transmission-type diffraction grating from the left thereof, and the right half of FIG. 10A indicates the substrate (sub). The transmission-type diffraction grating offers the maximum diffraction efficiency under a condition that refraction by a blaze surface and diffraction by a cyclic structure are in phase synchronization. As indicated in FIG. 10A, to achieve the maximum diffraction efficiency, the height of a recessed/projected pattern needs to be large, the angle of the pattern needs to be 70 degrees to 80 degrees, and the aspect ratio of the pattern, which is given by dividing the height by the cycle of the pattern, needs to be 10 or more. An ordinary plastic molding method, such as injection molding, poses such a problem as deteriorated transferability when the aspect ratio exceeds 1, and this problem leads to a drop in yield in mass production. Given this fact, it is found that the transmission-type diffraction grating shown in FIG. 10A is not applicable as the incidence diffraction grating of this embodiment.

Figure 10B:
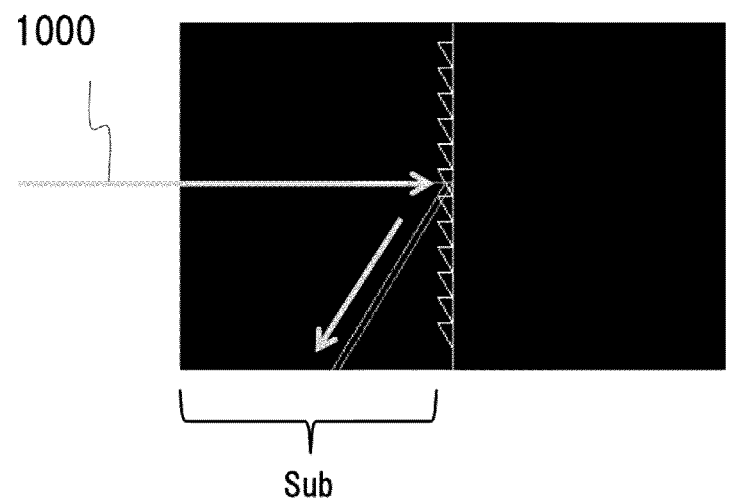
FIG. 10B is an image diagram showing a beam of light diffracted by a reflection-type incidence diffraction grating.

FIG. 10B is a simulation result of a reflection-type diffraction grating. In the reflection-type diffraction grating, incident light is reflected/diffracted, that is, reflected to the light source side, and propagates inside the light-guide plate (substrate). The incidence diffraction grating is formed on a surface of light guide plate that is far from the light source.

The beam of image light enters the reflection-type diffraction grating from the left thereof, as in the case of the transmission-type diffraction grating, and the right half of FIG. 10B indicates the substrate (sub). The reflection-type diffraction grating offers the maximum diffraction efficiency under a condition that refraction by a blaze surface and diffraction by a cyclic structure are in phase synchronization. It is understood from FIG. 10B that, different from the transmission-type diffraction grating, the reflection-type diffraction grating meets this condition by a recessed/projected pattern with a low aspect ratio. In this configuration, the pattern height of the recessed/projected pattern is about 250 nm, and the aspect ratio of the same is about 0.57. In the above-described prototype element, in contrast, it is necessary that a triangular recessed/projected pattern with a pattern height of 374 nm be transferred in a fine condition. It can be said, therefore, that using the reflection-type diffraction grating as the light-guide plate of the present embodiment is a preferable approach.

Figure 11A:
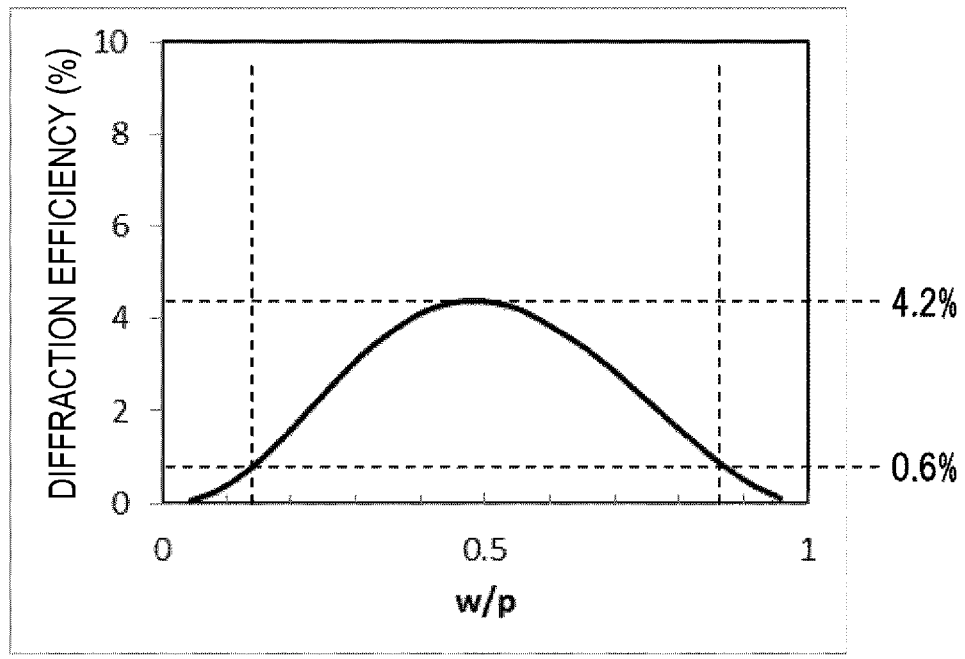
FIG. 11A is a graph showing a relationship between a pattern width and a diffraction efficiency.
Figure 11B:
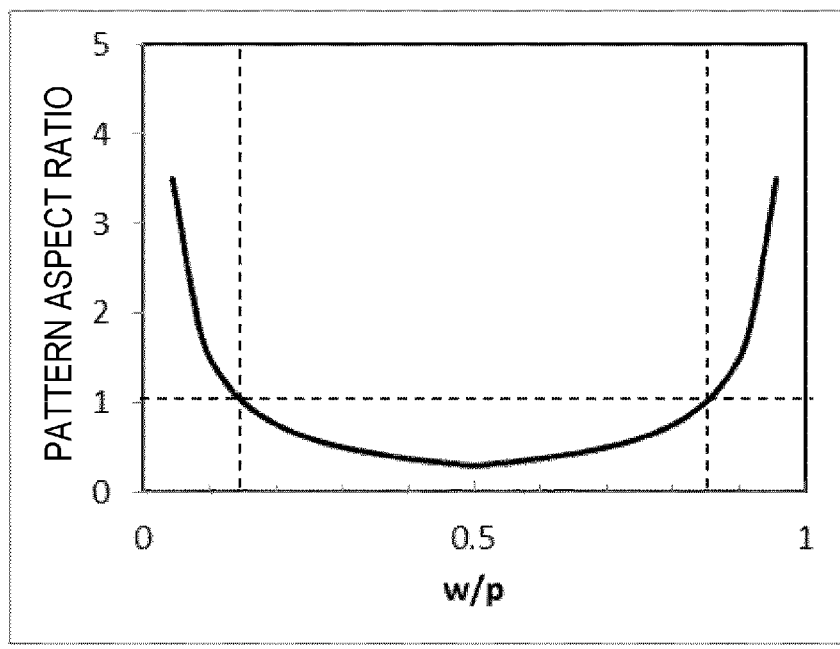
FIG. 11B is a graph showing a relationship between a pattern width and an aspect ratio.
Figure 11C:
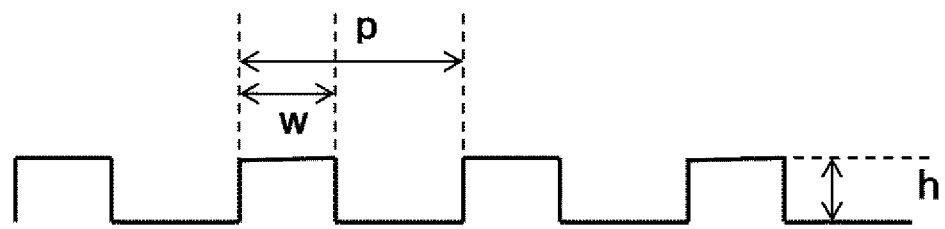
FIG. 11C is a conceptual diagram showing a definition of duty.

FIGS. 11A and 11B are graphs of simulation results showing a relationship between the duty, the diffraction efficiency, and the aspect ratio of the pattern. As shown in FIG. 11C, when the pattern pitch of the diffraction grating is denoted as p and the pattern width of the same as w, the duty of the diffraction grating is expressed as w/p. In this simulation, the pattern pitch P is 460 nm, the pattern height is 70 nm, the wavelength of the beam of light is 550 nm, the thickness of the light-guide plate is 1.0 mm, and the refraction factor of the light-guide plate is 1.58. The viewing angle of the projected image is 40 degrees.

FIG. 11A shows a relationship between the first-order diffraction efficiency $\eta_1$ and w/p. It is understood from FIG. 11A that the first-order diffraction efficiency $\eta_1$ takes a maximum value of about 4.2% at w/p=0.5, and decreases as w/p approaches 0 or 1. It can be said that, to obtain a diffraction efficiency of about 0.6%, w/p of the diffraction grating of the mesh pattern of the present embodiment needs to be set within a range of 0.15 or more and 0.85 or less. It can also be said that w/p remaining in a range of 0.3 or more and 0.7 or less provides a better diffraction efficiency and that w/p remaining in a range of 0.4 or more and 0.6 or less provides the best diffraction efficiency.

FIG. 11B shows the aspect ratio of the pattern. Since the pattern height is fixed to 70 nm, w/p approaching 1 or 0 increases the aspect ratio. When determining the aspect ratio of the pattern to be 1 or less is taken as criteria for adopting the injection molding method or the like, it can be said that w/p of the diffraction grating of the mesh pattern of the present embodiment needs to be set within the range of 0.15 or more and 0.85 or less. w/p corresponding to the point of the minimum aspect ratio, which makes manufacturing easy, is w/p=0.5.

Based on the above explanation, it can be said that, in principle, when w/p=0.5, that is, w=p−w, the diffraction efficiency of the diffraction grating is at maximum and the aspect ratio of the pattern is at minimum.

Figure 12:
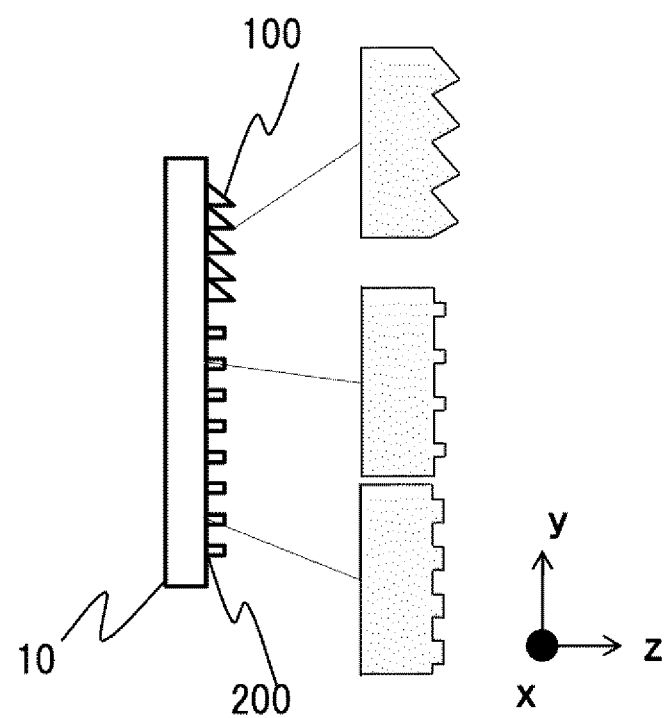
FIG. 12 is a side view of a light-guide plate of the embodiment that remedies luminance brightness.

FIG. 12 is a schematic diagram of the light-guide plate of the present embodiment that further reduces uneven brightness. In FIG. 12, 10 denotes the light-guide plate, 100 denotes the incidence diffraction grating, and 200 denotes the emission diffraction grating. As it can be seen from FIG. 12, changing the duty of the recessed/projected pattern of the emission diffraction grating according to its distance to the incidence diffraction grating 100 gives the diffraction efficiency a distribution pattern. This allows further remedying the uneven brightness of the projected image. In a specific example, as indicated in FIG. 11A, a part of emission diffraction grating 200 that is close to the incidence diffraction grating 100 has a duty of about 0.2 which provides a low diffraction efficiency. A part of emission diffraction grating 200 that is far from the incidence diffraction grating 100, on the other hand, has a duty of about 0.5 which provides a high diffraction efficiency.

As described above, by using the diffraction grating of the mesh pattern of the present embodiment, the light-guide plate can be provided by the plastic molding technique, such as the injection molding method.

Second Embodiment

Now, compared with conventional glass light-guide plates, a plastic light-guide pate is inferior in mechanical strength (Young's modulus), and therefore its deformation under ambient temperatures or atmospheric pressure is greater. A solution to this problem provided by the present embodiment will hereinafter be described.

Figure 13A:
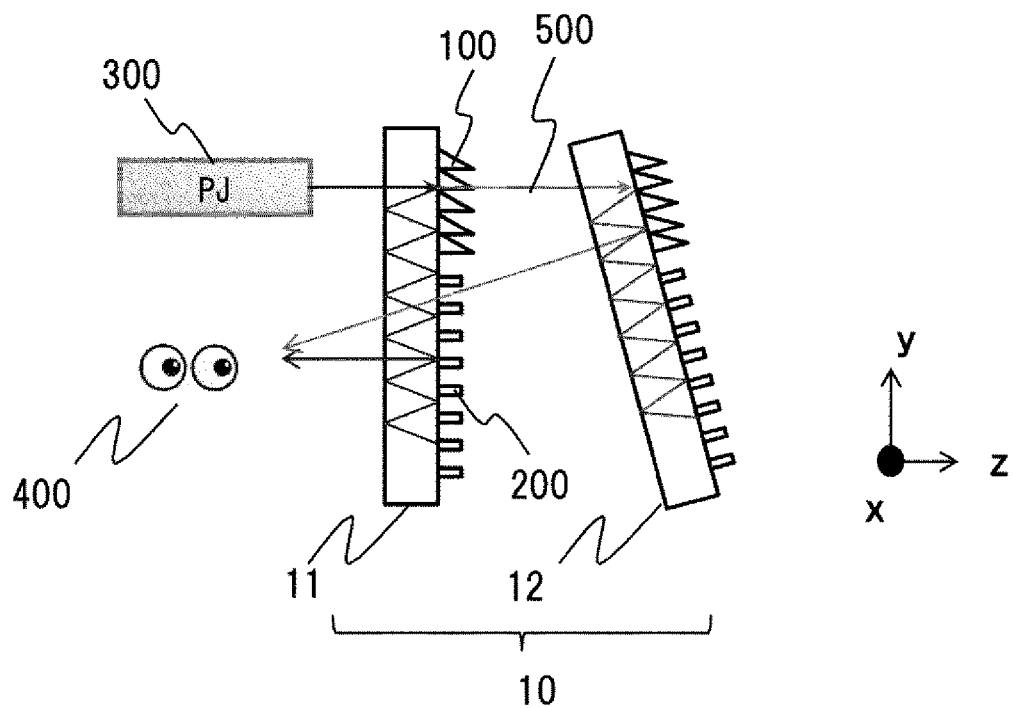
FIG. 13A is a schematic diagram of an example in which a projector and the pupils are present on the same side with respect to the light-guide plate.
Figure 13B:
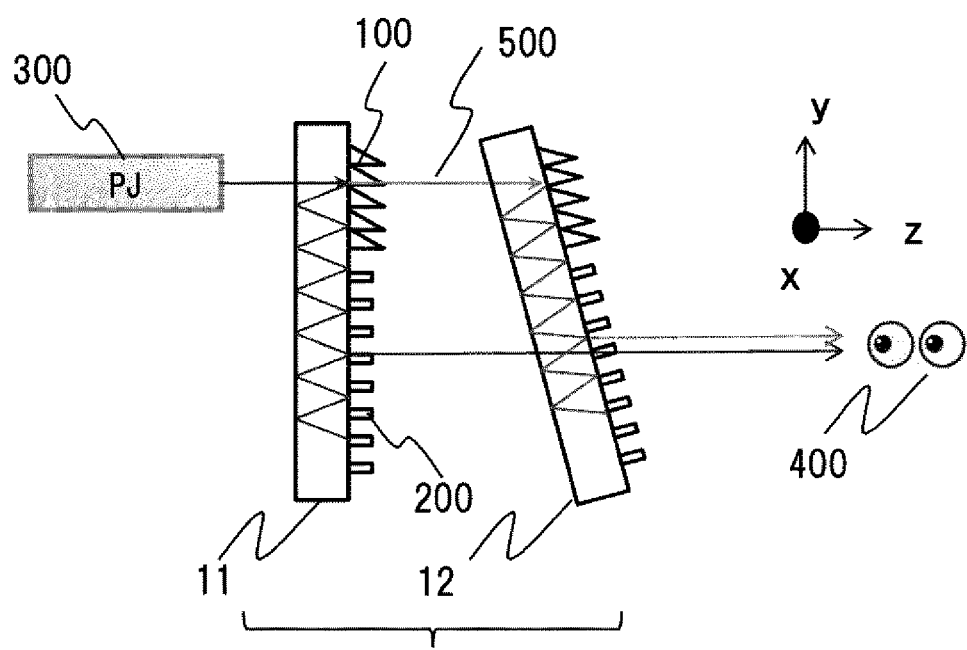
FIG. 13B is a schematic diagram of an example in which the projector and the pupils are opposite to each other with respect to the light-guide plate.

FIGS. 13A and 13B are schematic diagrams showing the effects of two light-guide plates being tilted relative to each other. In each of FIGS. 13A and 13B, the light-guide plate 10 is composed of light-guide plates 11 and 12 having their respective corresponding wavelengths that are different from each other. In FIGS. 13A and 13B, 300 denotes the projector for image projection, 400 denotes the user's pupils, and 500 denotes a beam of image light projected.

In this example, the reflection-type diffraction grating is adopted as the incidence diffraction grating, based on knowledge obtained from the simulation result of FIG. 10B. The incidence diffraction grating 100 is, therefore, formed on the surface of light-guide plate 10 (each of the light-guide plates 11 and 12) that is far from the projector 300 (the surface on the right side in FIGS. 13A and 13B). For process-related reasons, the emission diffraction grating 200 is improved in its precision when formed on the same surface where the incidence diffraction grating 100 is formed. Thus, the emission diffraction grating 200 is also formed on the surface far from the projector 300.

FIG. 13A shows a case where the projector 300 and the user's pupils 400 are located on the same side with respect to the light-guide plate 10. As indicated in FIG. 13A, the light-guide plate 10 reflects the beam of image light 500 and finally delivers it to the user. In this configuration, when the light-guide plate 12 is tilted relative to the light-guide plate 11, a visually recognized pixel position is shifted by the wavelength of the beam of light projected, which results in a drop in image quality. The user with eyesight of 1.0 is capable of resolving a beam of light with an angle of up to 1/60 degree. Given this standard resolution capability, it is necessary that the relative tilt of the two light-guide plates be sufficiently smaller than 1/60 degrees. Particularly, the plastic light-guide plate with the relative tilt exceeding 1/60 degree is difficult to be used as a head mounted display.

FIG. 13B shows a case where the projector 300 and the user's pupils 400 are located opposite to each other with respect to the light-guide plate 10. As indicated in FIG. 13B, the light-guide plate 10 transmits the beam of image light 500 and finally delivers it to the user. Since incident light and emitted light basically have the same angle, even if the light-guide plates 11 and 12 are tilted relative to each other, in principle, a shift in the projected image caused by the wavelength does not occur. When the plastic light-guide plate of the present embodiment is used as the head mounted display, therefore, it is desirable that the projector, i.e., the light source be located opposite to the user with respect to the light-guide plate (transmission type). In a practical situation, however, angle conditions of the beam of light are affected as the beam of light is totally reflected and guided inside the light-guide plate. It should be noted, therefore, that the relative tilt of the light-guide plates 11 and 12 should desirably be about 3 degrees or less.

Comparing FIG. 13B with FIG. 13A reveals that a positional relationship between the projector and the user's eyes of FIG. 13B is reverse to the same of FIG. 13A with respect to the light-guide plate. The effect of this configuration can be dealt with by inverting the image to be projected.

Third Embodiment

Figure 14A:
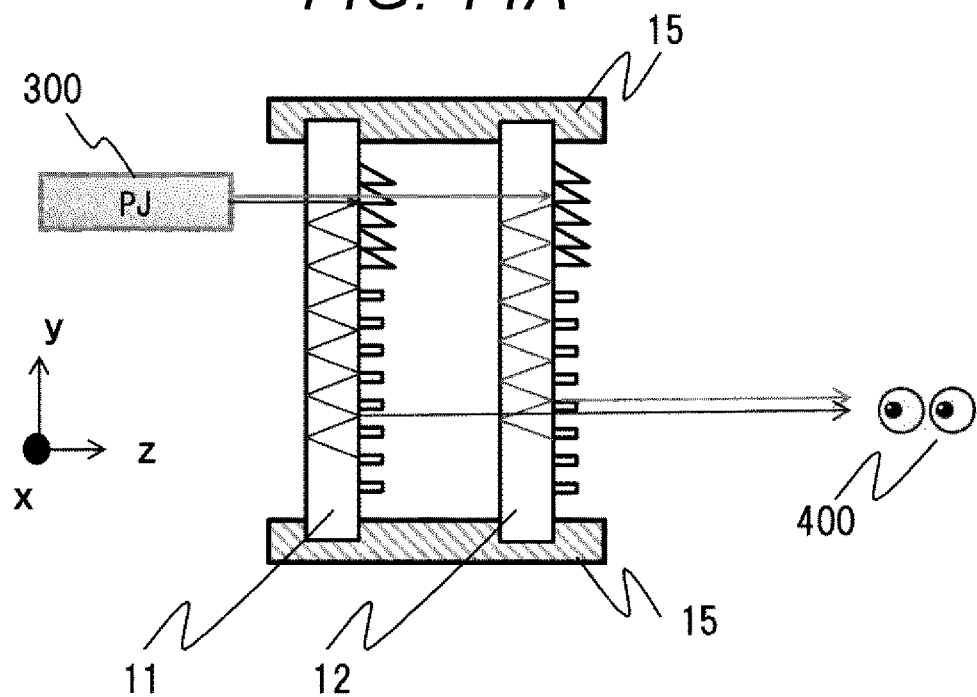
FIG. 14A is a schematic diagram for explaining a projected image in a case where a light-guide plate of an embodiment is not deformed.
Figure 14B:
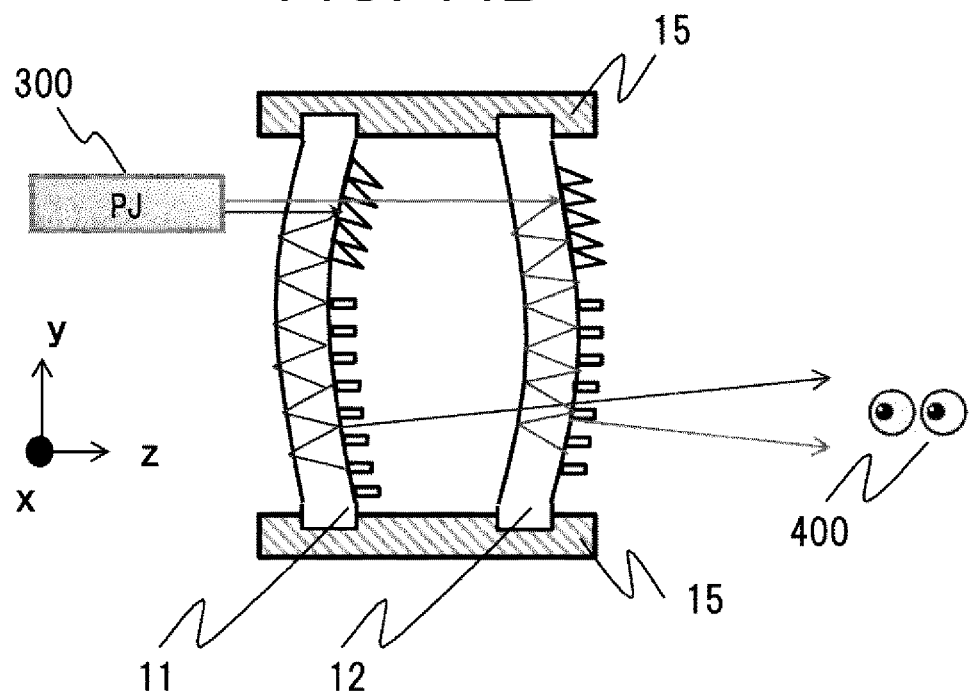
FIG. 14B is a schematic diagram showing an effect on a projected image in a case where the light-guide plate of the embodiment is deformed.

An embodiment that offers another solution in which deformation of the plastic light-guide plate is taken into consideration will hereinafter be described. FIGS. 14A and 14B are schematic diagrams showing a case where two light-guide plates held by holding frames or the like bend due to the ambient temperature or atmospheric pressure.

FIG. 14A depicts a case where the two light-guide plates 11 and 12 are held by frames 15 for mechanical strength enhancement and positioning. From the mechanical precision point of view, a gap of about 100 μm is considered to be a proper gap between the two light-guide plates. It is assumed that the frames 15 have proper airtightness that prevents entry of dust and the like into a space between the light-guide plates and dew condensation as well.

FIG. 14B schematically shows a state in which a stress develops due to a change in the atmospheric pressure or ambient temperature and the plastic light-guide plate, whose strength smaller than that of glass, is deformed by the stress. Similar to the above-described case, the pixel position visually recognized by the user is shifted by the wavelength (color), and consequently the projected image is deteriorated in quality.

Figure 15A:
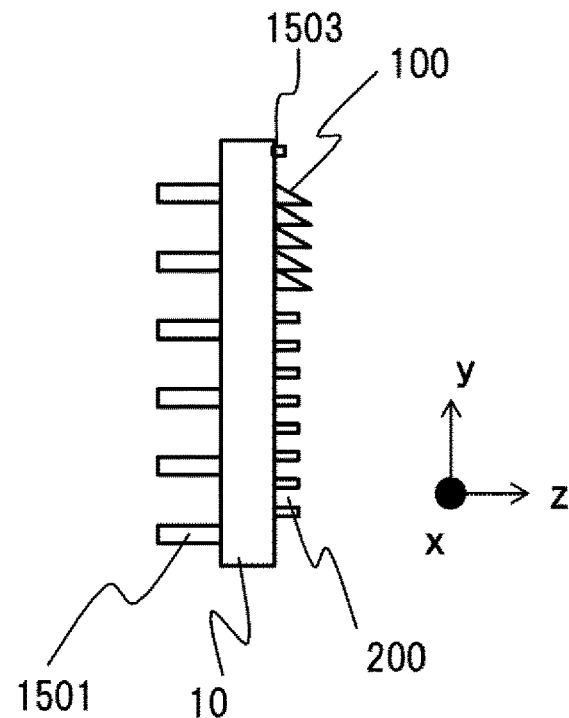
FIG. 15A is a side view of a light-guide plate of the embodiment that suppresses deformation.
Figure 15B:
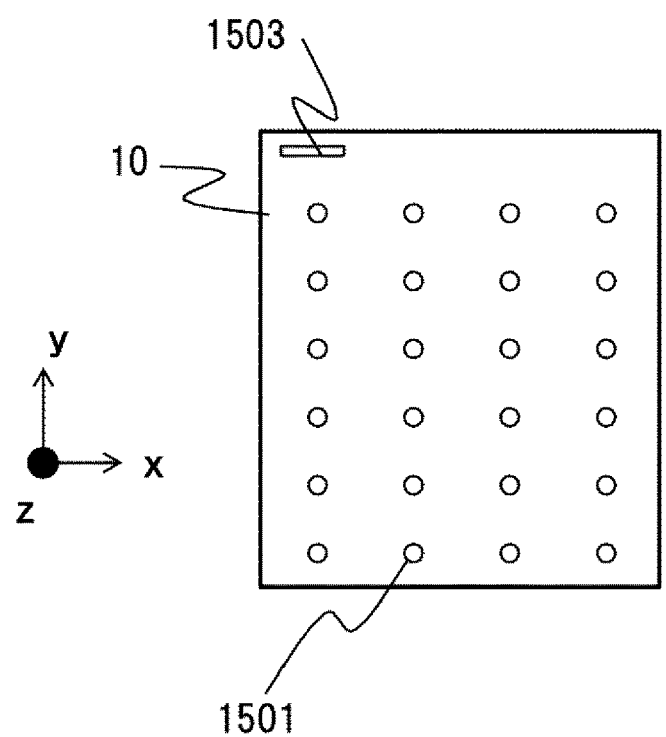
FIG. 15B is a top view of the light guide plate of the embodiment that suppresses deformation.
Figure 15C:
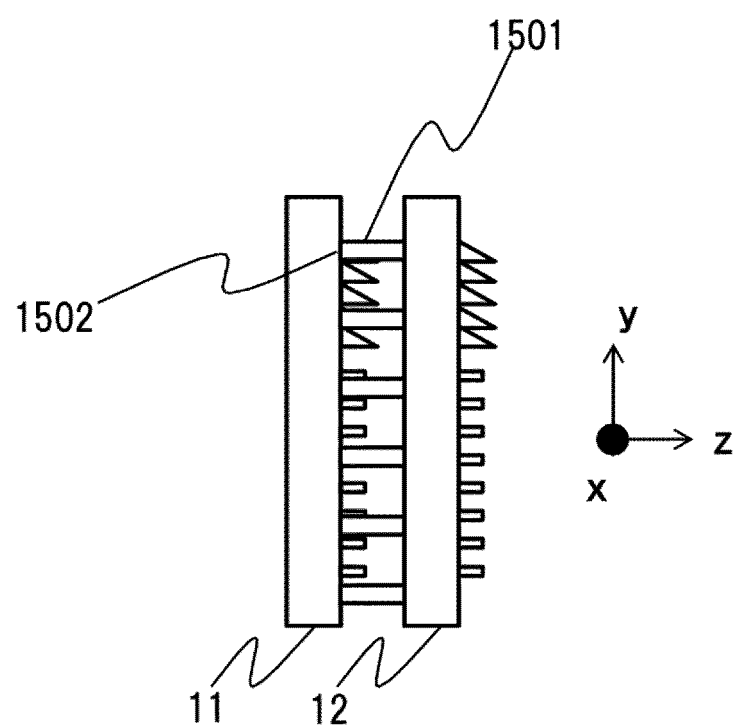
FIG. 15C is a side view of a light-guide plate module of the embodiment that suppresses deformation.

FIGS. 15A, 15B, and 15C are schematic diagrams showing a light-guide plate of the present embodiment that remedies a bend caused by environmental conditions.

FIG. 15A shows one light-guide plate 10 including the incidence diffraction grating 100 and the emission diffraction grating 200, which are formed on the front surface of the light-guide plate 10, and a columnar gap holding pattern 1501, which is formed on the back surface of the light-guide plate 10.

FIG. 15B depicts arrangement of pattern elements of the gap holding pattern 1501 on the x-y plane. For example, when the light-guide plate 10 is a square with each side of 40 mm long, the pattern elements of the gap holding pattern 1501, the pattern elements each having a diameter of 10 μm and a height of 10 μm, are formed at intervals of 200 μm. In the plastic molding method, such as the injection molding method, double-surface molding can be easily performed by incorporating two stampers, which fixes a surface pattern, into a mold.

FIG. 15C is a schematic diagram showing a case where the two light-guide plates 11 and 12 are combined. As shown in FIG. 15C, the two light-guide plates are arranged close to each other with the gap holding pattern 1501 interposed therebetween. A bonding portion 1502 can be bonded by a plastic bonding method using ultrasonic waves, laser beams, heat treatment, and the like. An adhesive may be used for the bonding. In this configuration, the two light-guide plates can be held across a gap equivalent to the height of the gap holding pattern 1501.

A result of a deformation simulation performed under cyclic boundary conditions has led to a conclusion that the bend of the light-guide plates shown in FIG. 14B is reduced to 1/100 or less. To reduce the bend while maintaining the quality of the projected image, it is desirable that an area occupied by the gap holding patterns 1501 be about 0.1% to 5.0% of the area of the light-guide plate.

Stampers to be used will be additionally described. As a stamper for the incidence diffraction grating and the emission diffraction grating, for example, a Ni stamper constructed by transferring a pattern to a Si matrix using a Ni electroforming technique, the Si matrix being created by patterning on a Si wafer using a reduction exposure method, an electron beam (EB) lithography method, or the like, can be used. Likewise, as a stamper for the gap holding patterns, a Ni stamper constructed by transferring a pattern to a Si matrix using the Ni electroforming technique, the Si matrix being created by patterning on a Si wafer using an adhesion exposure method, such as i-ray lithography, can be used. It is possible that these stampers are formed at different locations on one Si wafer in a clean room, and that the formed Ni stampers cut out by a cutting machine are used. This process makes the Ni stampers uniform in thickness, thus facilitating an improvement in molding precision. In addition, it is more preferable that a mark 1503 serving as a reference mark for determining the relative positions of the two light-guide plates or a reference mark for cutting out the Ni stamper be formed simultaneously with the diffraction grating by the patterning process.

Fourth Embodiment

Figure 16:
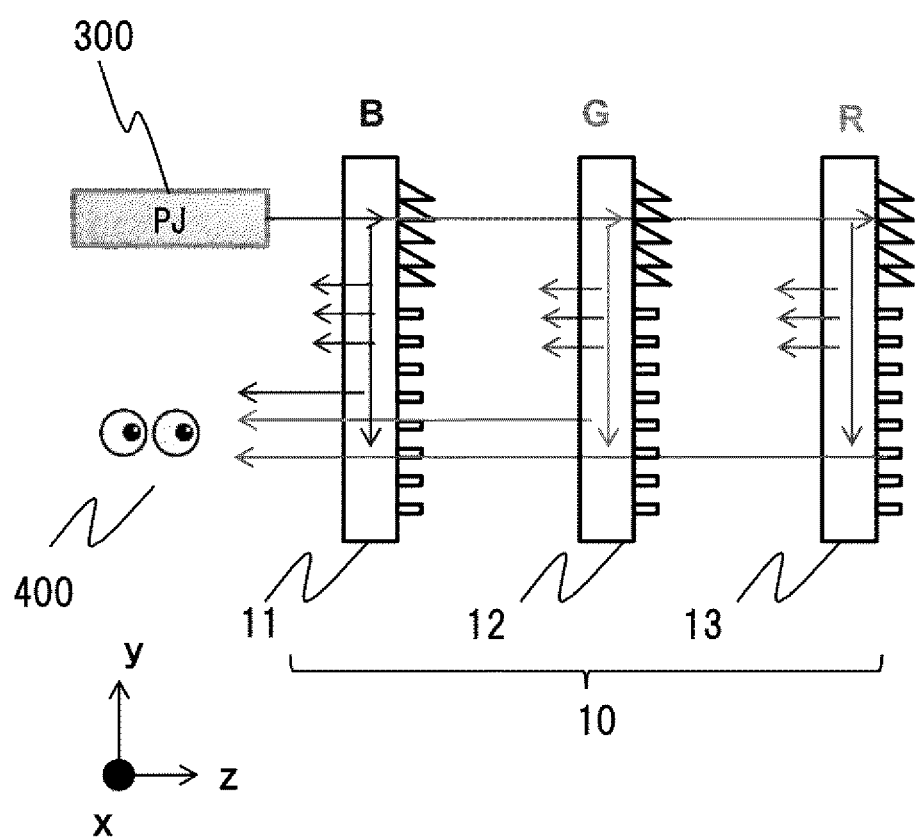
FIG. 16 is a schematic diagram showing a configuration of an image display device according to an embodiment.

FIG. 16 is a schematic diagram showing a configuration of an image display device of the present embodiment. In FIG. 16, light emitted from the projector 300, the light carrying image information, propagates in light-guide plates 11, 12, and 13 for B, G, and R, which act on the light to deliver it to the user's pupils 400, where the incoming light creates an augmented reality. The light-guide plates 11, 12, and 13 for B, G, and R are a combination of the light-guide plates of the present embodiment shown in FIG. 6, and the pitch and depth of the diffraction gratings formed on each light-guide plate are optimized according to each color of light.

In FIG. 16, the image display device of the present embodiment includes the light-guide plate 10, the projector 300, and a display image control unit (not illustrated). The light-guide plate 10 is constructed by combining together the light-guide plates 11, 12, and 13 for R, G, and B to offer a color display function. In addition, as image forming means, widely known image forming apparatuses can be used. Such image forming apparatuses include, for example, an image forming apparatus composed of a reflection-type or transmission-type spatial light modulator, a light source, and a lens, an image forming apparatus composed of an organic/inorganic electro luminescence (EL) element array and a lens, an image forming apparatus composed of a light-emitting diode array and a lens, and an image forming apparatus composed of a combination of a light source, a semiconductor micro electro mechanical systems (MEMS) mirror array, and a lens.

Further, an image forming apparatus in which an LED or a laser light source and a tip of an optical fiber are caused to resonate by using a MEMS technology, PZT, or the like can also be used. Among these image forming apparatuses, the most widely used one is the image forming apparatus composed of the reflection-type or transmission-type spatial light modulator, the light source, and the lens. As examples of the spatial light modulator, a reflection-type or transmission-type LC display device, such as a liquid crystal on silicon (LCOS), and a digital micromirror device (DMD) can be listed. As the light source, a white light source can be used by color separation into R, G, and B, and an LED or a laser capable of emitting multiple colors of light can also be used.

Furthermore, the reflection-type spatial light modulator may be composed of an LC display device and a polarization beam splitter that reflects part of light from a light source toward the LC display device and that transmits part of light reflected by the LC display device to guide the part of light to a collimating optical system including a lens. As examples of light-emitting elements making up the light source, a red-light-emitting element, a green-light-emitting element, a blue-light-emitting element, and a white-light-emitting element can be listed. The number of pixels may be determined on the basis of specifications required for the image display device. Examples of the specific number of pixels include 320×240, 432×240, 640×480, 1024×768, and 1920×1080, in addition to 1280×720 mentioned above.

In the image display device of the present embodiment, the light-guide plates 11, 12, and 13 are positioned so that a beam of image light emitted from the projector 300, the beam of image light carrying image information, is incident on respective incidence diffraction gratings of the light-guide plates 11, 12, and 13, and are integrated to form the light-guide plate 10.

In addition, the display image control unit (not illustrated) exerts a function of controlling the operation of the projector 300 and properly providing the user's pupils 400 with image information.

According to the embodiments described above, in the light-guide plate (image display element) having the diffraction gratings of the surface recessed/projected pattern, at least the diffraction grating of the mesh pattern is used as the emission diffraction grating and is integrally molded with a material having the same refraction factor as that of the waveguide, by the injection molding method or the like. This achieves plasticization of the light-guide plate, thus achieving the light-guide plate that is safe and light in weight. Specifically, by using the diffraction grating of the mesh pattern, the light-guide plate having surface recessions/projections with an aspect ratio of 1 or less and showing fine performance can be produced by the injection molding method. This makes it possible to improve the safety of the light-guide plate and reduce the weight of the same through plasticization of the light-guide plate.

In the present embodiment, the case of providing the user with image information has been described. However, the image display device of the present embodiment, for other applications, may further include various sensors, such as a touch sensor, a temperature sensor, and an acceleration sensor, for acquiring information of the user and the outside world, and an eye tracking mechanism for measuring the user's eye movement.

INDUSTRIAL APPLICABILITY

The light-guide plate can be used for various image display devices.

REFERENCE SIGNS LIST

10 light-guide plate
100 incidence diffraction grating
200 emission diffraction grating
300 projector
400 user's pupils
500 beam of image light

The invention claimed is:

1. A light-guide plate comprising:
   a substrate;
   an incidence diffraction grating that diffracts incident light; and
   an emission diffraction grating that emits light from the substrate, the light being diffracted by the incidence diffraction grating, the emission diffraction grating having two wave vectors that form an angle of 120°,
   wherein
   the emission diffraction grating is formed of a recessed/projected pattern formed on a surface of the substrate,
   the recessed/projected pattern includes a first group of parallel straight lines and a second group of parallel straight lines intersecting the first group of parallel straight lines, and a pitch of the first group of parallel straight lines is equal to a pitch of the second group of parallel straight lines, and
   a relationship between the pitch P of the first group of parallel straight lines and the second group of parallel straight lines and a pattern width W of the recessed/projected pattern is defined as W/P that is 0.15 or more and 0.85 or less.

2. The light-guide plate according to claim 1, wherein the substrate is made of a polymer compound material, and
   an aspect ratio of the recessed/projected pattern is 1 or less.

3. The light-guide plate according to claim 1, wherein an aspect ratio of the recessed/projected pattern is 0.25 or more and 1.0 or less.

4. The light-guide plate according to claim 1, wherein a pitch P of the first group of parallel straight lines and the second group of parallel straight lines is equal to a pitch of the incidence diffraction grating.

5. The light-guide plate according to claim 1, wherein the incidence diffraction grating is a reflection-type diffraction grating that causes incident light to propagate inside the substrate in a state of being reflected and diffracted, and is formed on a surface of the substrate that is a same as a surface where the emission diffraction grating is formed.

6. The light-guide plate according to claim 1, wherein the W/P is 0.3 or more and 0.7 or less.

7. The light-guide plate according to claim 1, wherein in the emission diffraction grating, a relationship between a pitch P of the first group of parallel straight lines and the second group of parallel straight lines and a pattern width W of the recessed/projected pattern changes, depending on a positional relationship between the emission diffraction grating and the incidence diffraction grating.

8. The light-guide plate according to claim 1, wherein the emission diffraction grating includes a part where the W/P is 0.4 or more and 0.6 or less.

9. A light-guide plate module comprising a plurality of the light-guide plates according to claim 1, the light-guide plates being stacked to make up the light-guide plate module.

10. The light-guide plate module according to claim 9, wherein a surface of the substrate of the light-guide plate, the surface carrying the incidence diffraction grating and the emission diffraction grating, is provided with an alignment mark.

11. An image display device comprising:
    the light-guide plate module according to claim 10; and
    a projector that emits image light onto the light-guide plate module, wherein
    the image light is incident on the incidence diffraction grating.

12. The image display device according to claim 11, wherein
    the substrate is made of a polymer compound material, and
    an aspect ratio of the recessed/projected pattern is 1 or less.

13. The image display device according to claim 11, wherein the light-guide plate module emits the image light to a side opposite to a side where the projector is disposed.

14. The light-guide plate module according to claim 9, wherein a surface of the substrate of the light-guide plate has a gap holding pattern having an occupancy area that is 0.1% to 5.0% of an area of the light-guide plate.

15. A manufacturing method for the light-guide plate according to claim 1, the manufacturing method comprising steps of:
    preparing the substrate made of a polymer compound material; and
    forming the incidence diffraction grating and the emission diffraction grating on the substrate, using a stamper.

16. A light-guide plate comprising:
    a substrate;
    an incidence diffraction grating that diffracts incident light; and
    an emission diffraction grating that emits the light the emission diffraction grating having two wave vectors that form an angle of 120°,
    wherein
    the emission diffraction grating is formed of a linear recessed/projected pattern formed on a surface of the substrate, and diffracts light in a direction perpendicular to the linear recessed/projected pattern at a diffraction efficiency $\eta_1$, the light coming from the incidence diffraction grating and propagating in the substrate, and at the same time, diffracts the light in a direction perpendicular to the substrate at a diffraction efficiency $\eta_{11}$, and
    a relationship between the diffraction efficiencies $\eta_{11}$ and $\eta_1$ is determined to be $\eta_{11} < \eta_1$.

17. The light-guide plate according to claim 16, wherein $\eta_{11}$ is set 0.8 to 1.2 times $(\eta_1)^2$.

* * * * *